United States Patent Office 2,874,026
Patented Feb. 17, 1959

2,874,026

PROCESS OF PREPARING A FLUORIDE OF TETRAVALENT URANIUM

Earl J. Wheelwright, Richland, Wash., assignor to the United States of America as represented by the United States Atomic Energy Commission No Drawing. Application July 24, 1957
Serial No. 673,985

9 Claims. (Cl. 23—14.5)

This invention deals with the production of a fluoride salt of tetravalent uranium from an aqueous solution of uranyl nitrate, and in particular of a fluoride salt that is suitable for reduction to metallic uranium with an alkaline earth metal.

Uranium tetrafluoride has been prepared heretofore from an aqueous solution of uranyl nitrate by heating the solution for evaporation and denitrification whereby uranium trioxide was obtained, by then reducing the uranium trioxide to uranium dioxide with dissociated ammonia at about 650° C., and finally treating the uranium dioxide with anhydrous hydrogen fluoride at between 375 and 625° C., whereby uranium tetrafluoride was obtained.

Another process considered and examined for the production of uranium tetrafluoride from uranyl nitrate solutions comprises the reduction of the hexavalent uranium to the tetravalent state with lead followed by fluorination. In the reduction step with lead, it always has been held vital that no nitric acid was present in the solution so that the uranium was not reoxidized to the hexavalent state and that thus the yield of the process was not impaired. Another drawback of that process was that the solution always contained a lead compound which later on contaminated the uranium tetrafluoride and metallic uranium produced therefrom.

The first-mentioned process producing the tetrafluoride via the uranium trioxide and uranium dioxide involves serious corrosion problems because of the use of hydrogen fluoride at high temperatures and in the presence of water. The second process has the disadvantages of necessitating the absence of nitric acid and entailing contamination by lead, as has been set forth above; in addition thereto, the yield is low because of reoxidation taking place. Furthermore, the tetravalent uranium showed a tendency to "polymerize," that is, compounds of high molecular weight formed due to oxygen bonds between molecules and precipitated. Also, gassing took place in the reduction vessel containing the lead.

It is an object of this invention to provide a process for the production of a fluoride salt of tetravalent uranium from aqueous uranyl nitrate solutions which is free from the above-listed disadvantages.

It is thus an object of this invention to provide a process for the production of a fluoride salt of tetravalent uranium from aqueous uranyl nitrate solutions in which the reactions are essentially quantitative so that a high yield is obtained.

It is also an object of this invention to provide a process for the production of a fluoride salt of tetravalent uranium from aqueous uranyl nitrate solutions in which no high-temperature fluorination is necessary so that no corrosion problems exist.

It is another object of this invention to provide a process for the production of a fluoride salt of tetravalent uranium from aqueous uranyl nitrate solutions which can be carried out in a comparatively short period of time.

It is a further object of this invention to provide a process for the production of a fluoride salt of tetravalent uranium from aqueous uranyl nitrate solutions in which no gassing during the reduction step and no polymerization of the tetravalent uranium compound take place.

Finally, it is also an object of this invention to provide a process for the production of a fluoride salt of tetravalent uranium from aqueous uranyl nitrate solutions which does not require any complicated or expensive equipment.

These objects are accomplished by adding to the aqueous solution of uranyl nitrate to be treated acetic acid and a nitrite-suppressor, then contacting the solution with metallic lead whereby reduction of the hexavalent uranium to the tetravalent state takes place and a lead acetate is formed and dissolved in the solution, converting the lead compound to an insoluble compound whereby a lead precipitate forms, removing the lead precipitate from the solution, and precipitating the uranium as an alkali- or a calcium-double-fluoride.

Because, as has been mentioned above, tetravalent uranium tends to polymerize at a pH value of above 2, the presence of an excess quantity of acid in the solution to be treated is necessary. Neither hydrochloric acid nor sulfuric acid were found suitable for this purpose, because they would precipitate lead during the subsequent reduction step. Nitric acid was found undesirable, too, because it caused gassing in the lead reduction step and also because the reduction was found to be incomplete from a nitric acid solution, even when a nitrite-suppressor had been added to the solution.

Acetic acid did not show any of these disadvantages; neither uranium polymerization, nor lead precipitation, nor gassing occurred. Acetic acid also has the advantage of converting the uranium (IV) compound formed to the soluble acetate. The amount of acetic acid in the uranyl nitrate solution found best suitable was between 7 and 9 moles of acetic acid per 1 mole of uranium.

To prevent the reoxidation of tetravalent uranium to the hexavalent state by any nitrite formed from the nitric acid, a so-called nitrite-suppressor has to be added according to the process of this invention. Suitable nitrite-suppressors, for instance, are sulfamic acid and urea, the latter being preferred. The addition of half a mole of urea per one mole of uranium yielded a reduction of 99 percent when the solution at a rate of between 60 and 70 milliliters per minute was flowed through a column filled with lead particles, while a quantity of 2 moles of urea per one mole of uranium, under the same conditions, brought about a reduction yield of 99.9 percent. The dependence of the reduction yield from the urea content is shown in the table below. For the runs summarized there the quantity of reduced uranium was calculated from the uranium content of the supernatant obtained after the tetravalent uranium had been precipitated therein with hydrogen fluoride.

| Moles of urea per mole of uranium | Percent reduction |
|---|---|
| 1.94 | 99.95 |
| 1.94 | 99.83 |
| 1.94 | 99.90 |
| 1.94 | 99.70 |
| 1.94 | 99.80 |
| 0.70 | 99.2 |
| 0.70 | 99.7 |
| 0.70 | 99.2 |
| 0.70 | 99.2 |
| 0.00 | 95 |

The reduction of the uranium with lead can be carried out in any way known to those skilled in the art. A vertical column filled with lead particles through which the uranium solution was passed in a semicontinuous procedure was especially well suitable. For instance, a glass column having a diameter of 2.2 centimeters, provided with a coarse, fritted glass disc at its lower end and filled to a height of 30 centimeters with lead spheres of an average diameter of one millimeter gave satisfactory results. For large-scale runs larger columns were used. Reduction was performed in one instance, for example, by pouring about 300 milliliters of a solution containing 0.12 mole of uranyl nitrate through a lead-filled column. In another instance, a large-scale column and a solution of 0.4 M in uranyl nitrate were used; the flow rate in that case was 232 gal./hr./ft.$^2$ which represented an uranium quantity of 186 lb./hr./ft.$^2$ The lead taken up by the solution during the reduction step is then removed by precipitation; this is done by passing the effluent from the reduction column into dilute sulfuric acid. The precipitated lead sulfate is then removed by customary means, such as filtration or centrifugation. Thereafter the lead sulfate is washed in order to remove any adhering uranium salt, e. g., with dilute sulfuric acid; the washing solutions are added to the uranium (IV) solution for uranium precipitation.

The reduced uranium is then precipitated from the solution, preferably in the form of a double fluoride of uranium and alkali or calcium which are ideally suitable for the reduction to uranium metal with an alkaline earth metal in an autoclave.

For conversion to the sodium uranium (IV) fluoride, $NaUF_5$, for instance, an aqueous solution of sodium sulfate is first added to the uranium solution; the quantity suitable therefor is between 1.7 and 3.5 moles of sodium sulfate per one mole of uranium. Thereafter concentrated aqueous hydrofluoric acid is added under vigorous stirring, room temperature as well as elevated temperature being operative for this step. A temperature of about 80° C., however, is preferred for the uranium precipitation, because in this case the hydrofluoric acid can be added at a faster rate, the precipitate is crystalline, settles fast and can be washed and filtered easily. In contradistinction thereto, the precipitate obtained at room temperature is fluocculent, the hydrofluoric acid must be added dropwise, and stirring has to be continued for at least two more hours after the addition of hydrofluoric acid in order to convert the flocculent precipitate to a crystalline filterable state. Formation of the crystalline precipitate at 80° C. is complete in 15 to 20 minutes. The double salt precipitated at 80° C. has a considerably lower density than that formed at room temperature. In both cases, the sodium uranium fluoride obtained is the anhydrous salt.

In the case of other alkali-double-fluorides or the calcium-double-fluoride corresponding water-soluble salts are added instead of the sodium sulfate. In the case that the double salt produced is the ammonium uranium fluoride, the latter can be converted to the anhydrous uranium fluoride simply by heating to about 375° C.

The double fluoride is advantageously washed, for instance, with dilute hydrofluoric acid followed by water, thereafter with absolute ethyl alcohol and finally with petroleum ether. A series of washes and decantations for each washing agent was found particularly effective. Finally, the washed precipitate is dried prior to its use for the reduction to the metal.

As has been indicated before, the fluoride of tetravalent uranium produced by the process of this invention is primarily intended for the reduction to the uranium metal with magnesium or calcium in an autoclave, the so-called bomb. The average yield in the bomb reduction of the uranium fluorides produced by the process of this invention was within the range of 87 to 96 percent; the lead content in the uranium thus produced was between 20 and 50 parts per million.

In the following an example is given to illustrate the process of this invention.

*Example*

A feed solution was prepared by dissolving 60 gm. of uranyl nitrate, 5 gm. of urea and 60 ml. of glacial acetic acid in water and diluting the solution to 300 ml. This solution was poured through a lead reductor consisting of a Pyrex column 2.2 cm. in diameter, 30 cm. long and containing 1-mm.-diameter lead shot. A flow rate of about 60 ml. per minute was used which corresponds to a rate of 3.1 lbs. U min.$^{-1}$ ft.$^{-2}$. The effluent was collected in 200 ml. of a 2.7 M sulfuric acid; the last traces of uranium were washed from the reductor with dilute acetic acid.

The lead sulfate formed in the solution was allowed to settle, and the dark-green uranium (IV) solution was decanted off. The lead sulfate was washed three times by decantation with 300-ml. portions of dilute sulfuric acid and then transferred to a fritted glass funnel; there it was washed once again and finally dried by suction. All wash solutions were combined with the original uranium (IV) decantate.

This composite uranium (IV) solution was then heated to 80° C., and 60 gm. of sodium sulfate were dissolved in it. Then, while the solution was rapidly stirred, 30 ml. of concentrated hydrofluoric acid were added at a rapid dropwise rate. The stirring was continued for 20 mins.; then the precipitate was allowed to settle and cool. The salt was washed three times by decantation with dilute hydrofluoric acid and once with water; it was then transferred to a fritted glass funnel and washed there twice with absolute ethanol and twice with petroleum ether. After drying for 24 hours at 110° C. the salt was found to weigh 41.5 gm. and to have a composition $(UF_4)(NaF)_{1.06}$. The yield of this salt calculated from the uranium remaining in the combined supernatant and wash solutions after fluoride precipitation was found to be 99.2 percent.

A 37-gm. portion of the salt was intimately mixed with 15 gm. of calcium and 25 gm. of iodine. This mixture was then tamped into a magnesia-lined steel bomb which was placed into a small pot furnace; there the mixture was heated until the reaction started. The uranium button obtained weighed 22.7 gm. and contained 50 p. p. m. of lead. The metal reduction yield was 95.5 percent.

It will be understood that this invention is not to be limited to the details given herein, but that it may be modified within the scope of the appended claims.

What is claimed is:

1. A process of converting uranyl nitrate contained in an aqueous solution to an anhydrous uranium (IV) fluoride salt suitable for bomb reduction, comprising adding acetic acid and a nitrite-suppressor selected from the group consisting of sulfamic acid and urea to the aqueous solution, contacting said solution with metallic lead whereby the uranyl ion is reduced to the tetravalent state and lead acetate is formed and dissolved in the solution, precipitating the lead from said solution, removing the lead precipitate from the solution, adding a water-soluble salt having a cation selected from the group consisting of alkali metal, the ammonium radical and calcium to said solution, and then introducing hydrofluoric acid to said solution whereby an anhydrous double fluoride of said cation and uranium (IV) precipitates.

2. The process of claim 1 whereby acetic acid is added until the pH value of the solution is below 2.

3. The process of claim 2 whereby from 7 to 9 moles of acetic acid are added to the solution per one mole of uranium.

4. The process of claim 1 wherein the nitrite-suppressor is urea.

5. The process of claim 4 wherein at least half a mole of urea is added to each mole of uranium.

6. The process of claim 1 wherein the lead is precipitated from the solution as the sulfate by admixing sulfuric acid thereto.

7. The process of claim 1 wherein the water-soluble salt added for the precipitation of the double-fluoride of tetravalent uranium is sodium sulfate and wherein said sodium sulfate is added in a quantity of between 1.7 and 3.5 moles per each mole of uranium.

8. The process of claim 7 wherein the sodium sulfate is added to a solution having a temperature of about 80° C.

9. The process of converting uranyl nitrate to uranium (IV) acetate comprising adding acetic acid to an aqueous solution of uranyl nitrate until the pH value of the solution is below 2, adding urea to said solution, and then contacting the solution with metallic lead whereby a solution of uranium (IV) acetate is formed.

No references cited.